United States Patent [19]
Alderson

[11] 3,707,782
[45] Jan. 2, 1973

[54] NECK FOR TEST DUMMY

[75] Inventor: Samuel W. Alderson, New York, N.Y.

[73] Assignee: Alderson Research Laboratories, Inc., Stamford, Conn.

[22] Filed: June 23, 1971

[21] Appl. No.: 155,842

[52] U.S. Cl. ................................................35/17
[51] Int. Cl. ...........................................G09b 23/32
[58] Field of Search ...........................................35/17

[56] References Cited

UNITED STATES PATENTS

| 3,557,471 | 1/1971 | Payne et al. | 35/17 |
| 3,562,924 | 2/1971 | Baermann et al. | 35/17 |

*Primary Examiner*—Harland S. Skogquist
*Attorney*—Buckles and Bramblett

[57] ABSTRACT

An anthropomorphic test dummy wherein the simulated flesh section forming the neck defines a body of revolution at each end. The thoracic and head sections each defines a mating socket. In this manner, reasonable human contours are retained throughout the limits of normal motion of the head and neck.

8 Claims, 2 Drawing Figures

INVENTOR.
Samuel W. Alderson

NECK FOR TEST DUMMY

BACKGROUND OF THE INVENTION

Human simulations, known as anthropomorphic test dummies, are used extensively in automotive-safety research and testing and in the testing of escape systems, such as ejection seats and capsules, for military jet aircraft. Such dummies are intended to duplicate the human in such respects as size, contour, mass distribution, centers of gravity, moments of inertia, placement of articulations, and ranges of motion.

Some of these requirements become mutually exclusive because there are no dummy construction materials available which are comparable to human flesh in mobility. The human is able to make motions involving extensive angles of flexion or rotation with the flesh elongating, compressing, or otherwise "flowing" into the different contours. Such materials as rubber lattices have good capability for elongation, but cannot compress without buckling and, in any event, are too fragile for the violent test procedures involved. More durable materials have much more limited extensibility and again preclude the possibility of duplicating the action of human flesh during extensive motions.

Heretofore, this problem has been approached by designing flesh joints more or less coaxial or concentric with the dummy's skeletal joints. This approach has been utilized at such articulations as knees, elbows, ankles and wrists. However, all prior dummy designs have failed to produce joints of this type in the head and neck, and all existing anthropomorphic test dummies show flesh gaps during extreme motions of the head and neck. Such gaps have adverse effects as in testing an ejection seat where the occupants will be exposed to air speeds up to 600 knots with the gap causing "ballooning." In automotive tests for whiplash, present flesh padding at the back of the neck is readily pushed aside, causing headrests to be impacted by the neck skeletal-structures.

Accordingly, it is a primary object of the present invention to provide an anthropomorphic test dummy which retains reasonable human contours throughout the limits of normal motion of the head with respect to the thorax. Other objects, features, and advantages will be apparent from the following description and appended claims:

SUMMARY OF THE INVENTION

This invention is an improvement to an anthropomorphic test dummy which includes a thorax, a head, and hinge means interconnecting the thorax and the head in spaced relationship. A tubular neck section of simulated flesh encircles the hinge and defines a body of revolution at each end. A first socket defined by the head and receives one of the bodies of revolution. A second socket is defined by the thorax and receives the other body of revolution.

BRIEF DESCRIPTION OF THE DRAWINGS

The invention will be best understood by reference to the following description, together with the attached drawings, wherein.

DESCRIPTION OF THE PREFERRED EMBODIMENT

Figure 1:
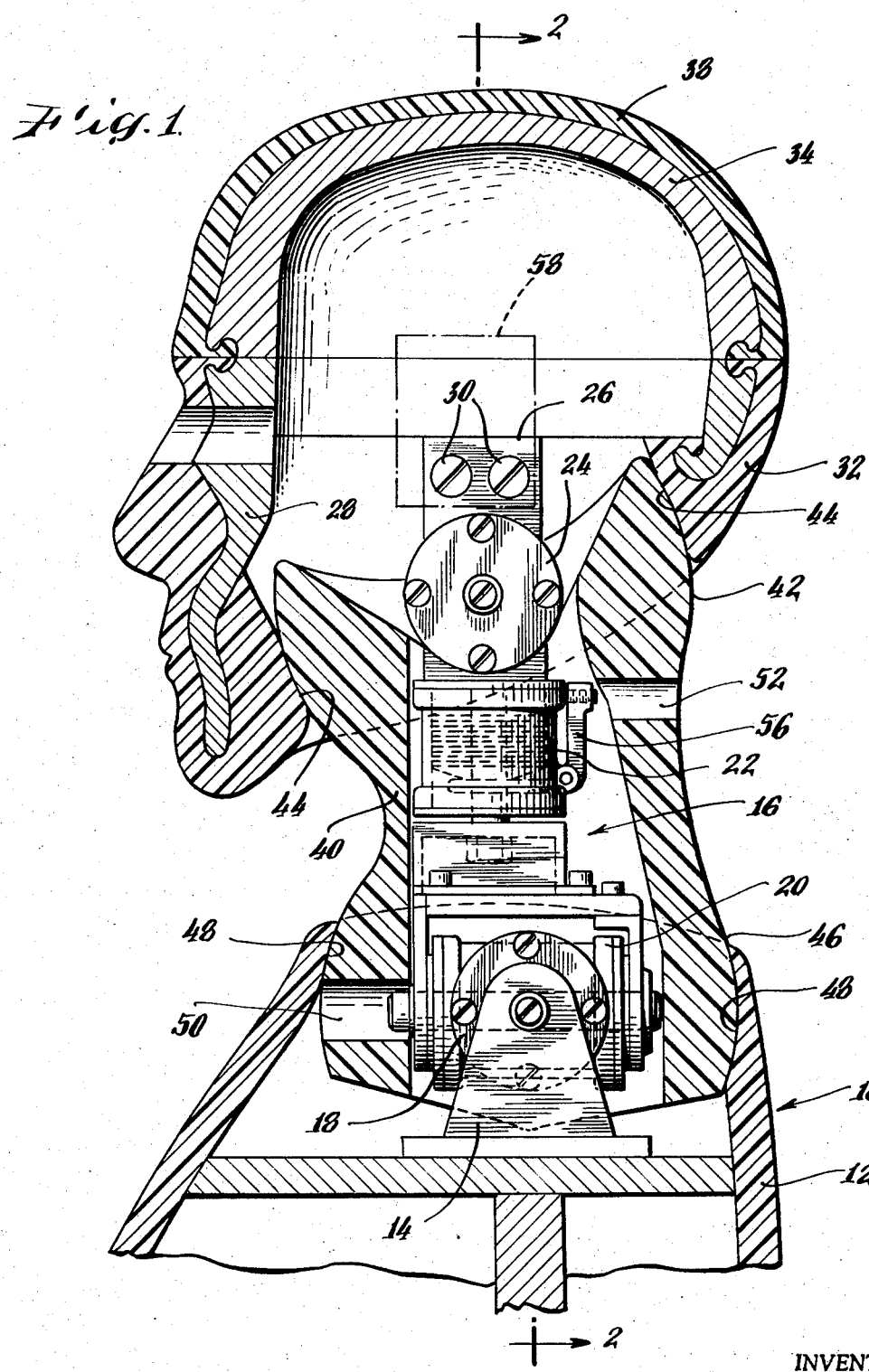
FIG. 1 is a side cross section of the head, neck and upper thorax portions of a dummy constructed in accordance with this invention.
Figure 2:
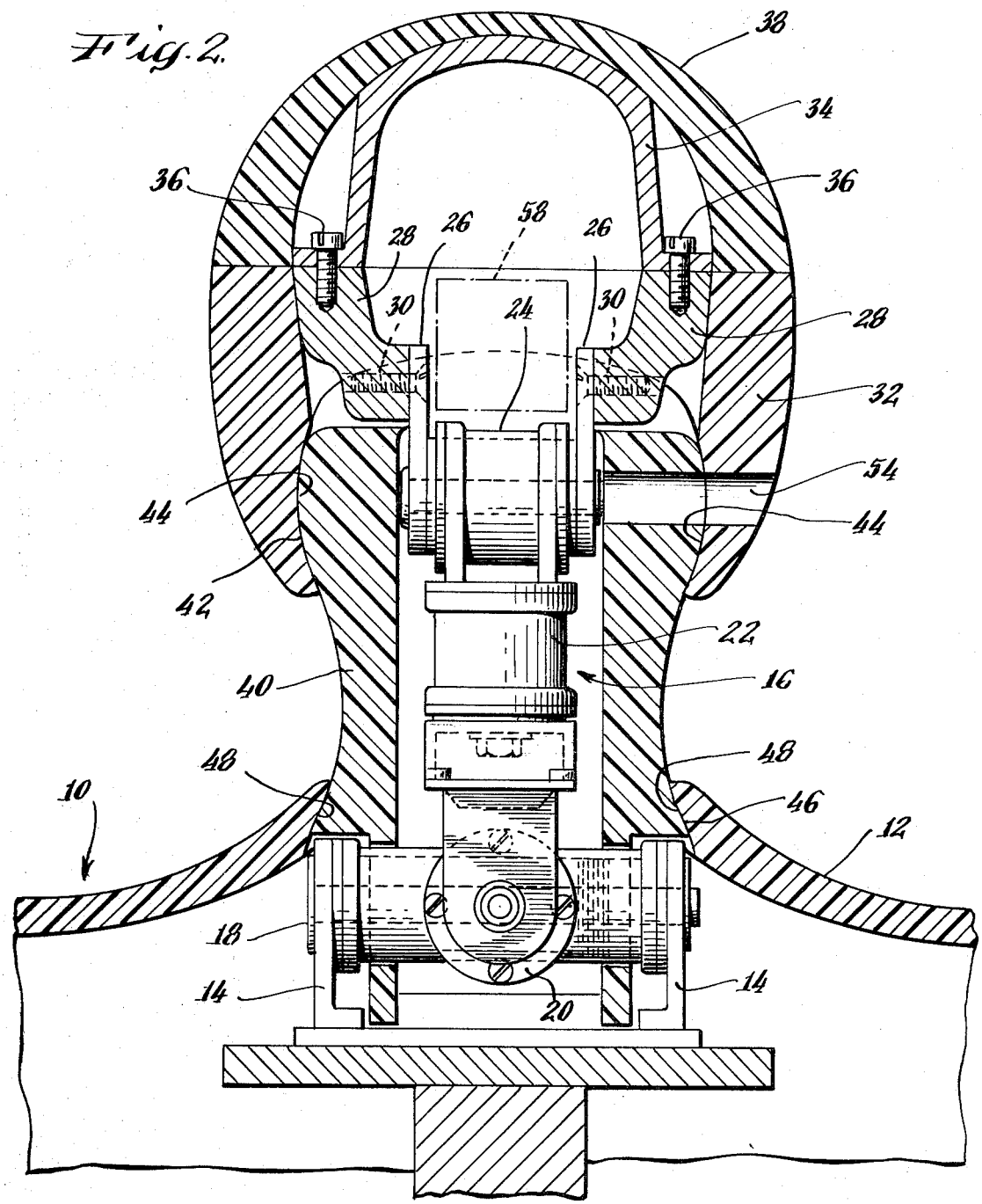
FIG. 2 is a cross section taken substantially along the line 2—2 of FIG. 1.

With reference to the drawings, there is illustrated the upper portion of the thorax 10 of a test dummy. Its outer surface comprises simulated flesh 12 of a suitable plastic, such as vinyl. Internally, the thorax houses a bracket 14 which supports the lower end of a hinge assembly 16. The hinge assembly comprises a plurality of hinge members which function as vertebrae. The friction of each hinge is independently adjustable by a tool, such as a screwdriver or Allen wrench. Their construction is fully disclosed in my co-pending U.S. Pat. application Ser. No. 155,811, filed June 23, 1971, for "Variable Friction Hinge." The lower vertebra 18 provides for flexion and hyperextension of the neck with respect to the thorax. Secured to it is a second vertebra 20 which provides for lateral flexion of the neck to either side with respect to the thorax. The third vertebra 22 provides rotation within the neck and the upper vertebra 24 provides for flexion hyperextension of the head with respect to the neck.

The upper vertebra 24 carries a pair of spaced brackets 26 which support a metal skull 28 by means of screws 30. The skull 28 is covered with simulated head flesh 32. The head is completed by a skull cap 34 which is secured to the skull 28 by means of screws 36, and is also covered with a simulated flesh head cap 38.

Surrounding the hinge assembly 16 is a neck 40 which is also formed of the simulated plastic flesh. The upper end of neck 40 defines a body of revolution 42 which has its center midway of the axis of rotation of vertebra 24. The head flesh 32 defines a socket 44 which mates snugly with body of revolution 42. The lower end of the neck 40 also defines a body of revolution 46 which has its center at the intersection of the axes of revolution of vertebrae 18 and 20. A mating socket 48 is formed at the top of the thorax 10. Ducts 50, 52, 54 are molded into the flesh of the neck and head to permit access to the vertebrae for hinge friction adjustment as described in the abovementioned copending patent application. Direct axial access to vertebra 24 may be had through duct 54 and similar access through duct 50 may be had to vertebra 20 when the neck is slightly hyperextended. Axial adjustment of vertebra 22 is made through duct 52 by the provision of a bell crank 56, making it unnecessary to dismantle the head when making the adjustment. The construction of this hinge and bell crank is fully set forth in the referenced copending application. Test instrumentation may be mounted in the head in instrumentation area 58.

It will now be noted that Applicant has provided a dummy with a neck-flesh section which cooperates with the head and thoracic flesh sections to provide continuous contours. Each end of the neck-flesh section is shaped as a body of revolution. The mating head-flesh joint is a socket at whose periphery the shape of the neck body of revolution is repeated. Thus, the head can flex and hyperextend throughout the normal motion range without opening gaps at this flesh joint. The interior of the skull is shaped in such a fashion as to permit this range of motion. The flesh joint has a circular cross section so that the head may rotate with respect to the neck without opening gaps in the flesh. Similarly, the neck flesh section at the base of the neck is shaped as a body of revolution in the direction of flexion hyperextension and as a body of revolution in the direction of lateral flexion. The mating socket in the thoracic section has similar contours to prevent the opening of gaps during motion. The relative amounts of motion in the fore and aft direction have been divided between the vertebrae 18 and 24 to match the maximum motion capabilities of these flesh joints.

As a result of the unique construction of the dummy of this invention, the head and neck portions are capable of completely natural reaction motion under high stress conditions. Most importantly, the joints of the neck remain smooth and closed and no gaps are created to disturb aerodynamic characteristics.

It will also be apparent to those skilled in the art that a number of variations and modifications may be made in this invention without departing from its spirit and scope. Accordingly, the foregoing description is to be construed as illustrative only, rather than limiting. This invention is limited only by the scope of the following claims:

I claim:

1. In an anthropomorphic test dummy including a thorax, a head, and hinge means interconnecting said thorax and head in spaced relationship, the improvement which comprises: a tubular neck section of simulated flesh encircling said hinge means and defining a body of revolution at each end thereof; a first socket defined by said head and receiving one of said bodies of revolution; and a second socket defined by said thorax and receiving the other of said bodies of revolution.

2. The improvement of claim 1 wherein the friction of said hinge means is adjustable.

3. The improvement of claim 2 wherein the simulated flesh portions of said dummy define ducts for permitting access to said hinge means of a friction-adjusting tool.

4. The improvement of claim 1 wherein said hinge means comprises a plurality of interconnected hinges.

5. The improvement of claim 4 wherein each of said hinges is independently friction adjustable.

6. The improvement of claim 4 wherein said hinges form a vertical, vertebrae-like column.

7. The improvement of claim 6 wherein the lower of said hinges is secured to the thorax and the uppermost hinge is secured to the head.

8. The improvement of claim 7 wherein the simulated flesh of said neck and head define ducts for permitting access of a friction adjusting tool to each of said hinges.

* * * * *